(12) United States Patent
Kirla (10) Patent No.: US 6,983,148 B1
(45) Date of Patent: Jan. 3, 2006

(54) HANDOVER PERFORMED WITHIN A BASE STATION CONTROLLER

(75) Inventor: Olli Kirla, Espoo (FI)

(73) Assignee: Nokia Corporation, Espoo (FI)

( * ) Notice: Subject to any disclaimer, the term of this patent is extended or adjusted under 35 U.S.C. 154(b) by 416 days.

(21) Appl. No.: 10/089,190

(22) PCT Filed: Sep. 27, 2000

(86) PCT No.: PCT/FI00/00827

§ 371 (c)(1),
(2), (4) Date: Mar. 27, 2002

(87) PCT Pub. No.: WO01/24558

PCT Pub. Date: Apr. 5, 2001

(30) Foreign Application Priority Data

Sep. 29, 1999 (FI) .................................. 19992090

(51) Int. Cl.
*H04Q 7/20* (2006.01)

(52) U.S. Cl. .................... 455/436; 455/437; 455/439; 455/442; 455/445; 455/560; 455/561; 370/331

(58) Field of Classification Search ........ 455/436–437, 455/439, 442, 445, 560–561; 370/331–334
See application file for complete search history.

(56) References Cited

U.S. PATENT DOCUMENTS

| | | | | |
|---|---|---|---|---|
| 5,446,739 A | * | 8/1995 | Nakano et al. ............. | 370/337 |
| 5,471,644 A | * | 11/1995 | Schatz et al. .............. | 455/436 |
| 5,818,824 A | * | 10/1998 | Lu et al. ..................... | 370/328 |
| 5,884,173 A | * | 3/1999 | Sollner ........................ | 455/436 |
| 5,930,714 A | * | 7/1999 | Abu-Amara et al. ........ | 455/442 |
| 6,061,566 A | * | 5/2000 | Friman ....................... | 455/445 |
| 6,064,885 A | * | 5/2000 | Rouhollahzadeh et al. . | 455/439 |
| 6,085,089 A | * | 7/2000 | Emmer et al. .............. | 455/439 |
| 6,097,951 A | * | 8/2000 | Ernam et al. ............... | 455/433 |
| 6,108,560 A | * | 8/2000 | Navaro et al. .............. | 455/517 |

(Continued)

FOREIGN PATENT DOCUMENTS

| | | |
|---|---|---|
| EP | 415 502 | 3/1991 |
| WO | WO 95/18513 | 7/1995 |

OTHER PUBLICATIONS

Nagatsuka et al., "CDMA Packet Transmission Control in the Third Generation Mobile Communications System," Personal, Indoor and Mobile Radio Communication, 1998, IEEE, vol. 1, pp. 178-182.

(Continued)

*Primary Examiner*—William Trost
*Assistant Examiner*—Sharad Rampuria
(74) *Attorney, Agent, or Firm*—Pillsbury Winthrop Shaw Pittman LLP (57) ABSTRACT

In a method for performing a handover with the view of changing a telecommunications channel utilized by a connection between a mobile station and a mobile services switching center in a mobile communications system, to make sure that the handover causes as little interference as possible to the ongoing connection, the allocation of a new radio channel to the connection involves checking whether a predetermined trigger condition is met, which happens if either the speech coding method or the data transfer rate changes, or if they both change at the same time, in connection with the handover, and directing the switching function of the mobile services switching center to perform the handover if the checks show that the handover is a BSC-internal handover where the trigger condition is met.

11 Claims, 7 Drawing Sheets

U.S. PATENT DOCUMENTS

| | | | | |
|---|---|---|---|---|
| 6,115,608 A | * | 9/2000 | Duran et al. | 455/436 |
| 6,125,120 A | * | 9/2000 | Lehtimaki | 370/435 |
| 6,138,020 A | * | 10/2000 | Galyas et al. | 455/436 |
| 6,381,232 B1 | * | 4/2002 | Strawczynski et al. | 370/333 |
| 6,466,556 B1 | * | 10/2002 | Boudreaux | 370/331 |
| 6,493,555 B2 | * | 12/2002 | Saada et al. | 455/438 |
| 6,519,260 B1 | * | 2/2003 | Galyas et al. | 370/395.42 |
| 6,580,699 B1 | * | 6/2003 | Manning et al. | 370/331 |

OTHER PUBLICATIONS

David et al., "Handover and Link Adapation Evaluation of the RACE/ATDMA System Concept for a 3rd Generation Air Interface by Simulation," IEEE, 46th, 1996, vol. 1, pp. 451-455.

* cited by examiner

HANDOVER PERFORMED WITHIN A BASE STATION CONTROLLER

This is a National Stage application of International Application No. PCT/FI00/00827, which was filed on Sep. 27, 2000, which designated the U.S., and was filed in the English language.

The invention relates to a handover performed in a mobile communication system where a connection between a mobile station and a mobile services switching centre is transferred from a first channel to a second channel. The invention relates particularly to the interference a handover performed within a base station controller causes to an ongoing connection.

A BSC-internal (Base Station Controller) handover takes place between base stations controlled by one and the same base station controller; a radio channel is allocated to a mobile station from another base station controlled by the same base station controller as the base station which provided the radio channel the mobile station had been using so far. Alternatively, the handover may take place within a base station in which case the mobile station is allocated a new radio channel from the same base station which provided the mobile station's previous radio channel. In this context the term 'radio channel' refers generally to a channel used on the radio path, such as a frequency channel, in a Frequency Division Multiple Access Radio System (FDMA) is concerned or a specific time slot on a frequency channel, when a Frequency Division Multiple Access and Time Division Multiple Access (FDMA/TDMA) radio system is concerned.

Figure 1A:
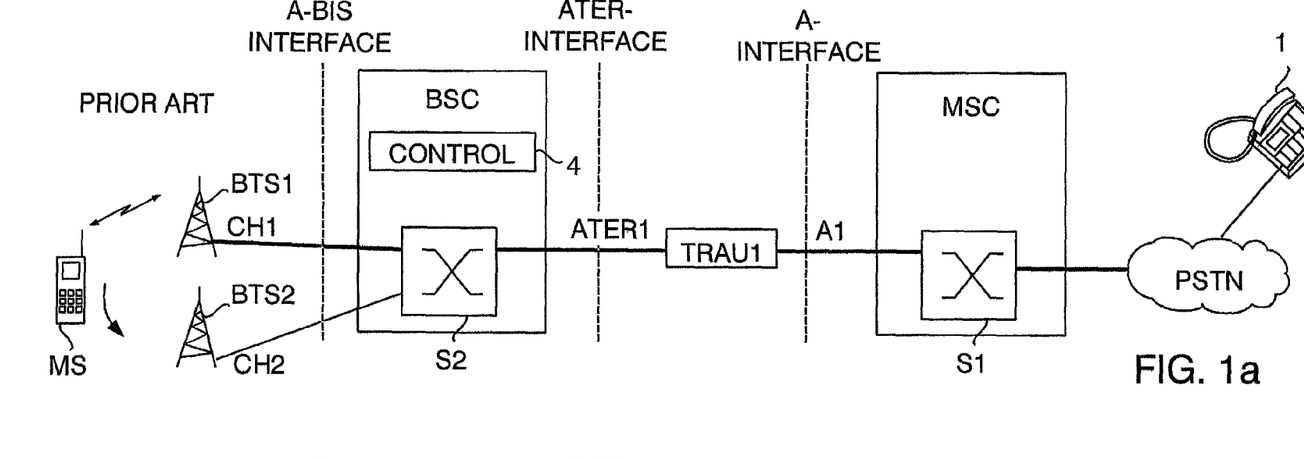
FIGS. 1a–1b illustrate a prior art mobile communication system.
Figure 1B:
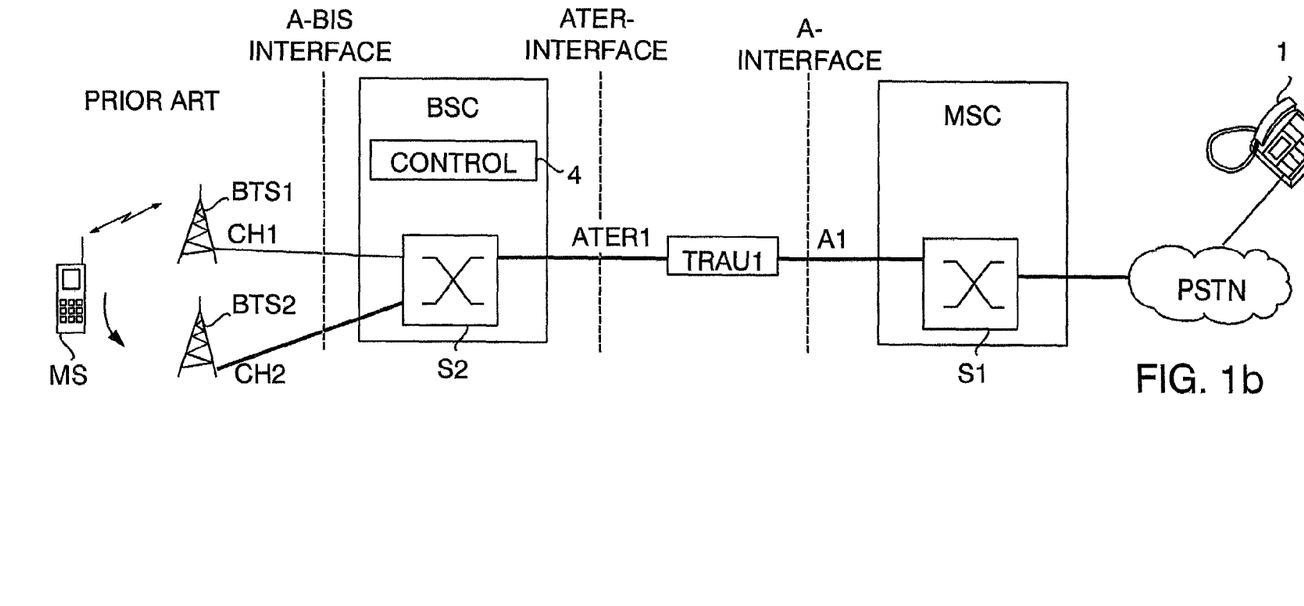

Prior art knows a mobile communication system, shown in FIGS. 1a and 1b, where BSC-internal handover processes are carried out by a switching function S2 located in the base station controller BSC. The switching function S2 can in this case operate similarly as a simple double-throw switch which allows a bidirectional data flow (i.e. the uplink and downlink data flows of a mobile station MS and a mobile services switching centre MSC) to be transferred simultaneously at a predetermined moment from the original telecommunication channel CH1 to a target channel CH2. If the telecommunication channels in question are served by two separate base stations, then the base station transmitting the connection, such as a call, changes during the handover process. FIG. 1a illustrates a situation before the handover and FIG. 1b after the handover. FIGS. 1a and 1b show that in the prior art solution the telecommunications channel changes only on the connection between the mobile station MS and the base station controller BSC.

One of the drawbacks of the above described prior art solution is that if there is a long transmission delay between the switching functions of the mobile station and the base station controller, or if the synchronization of the mobile station to a new channel is delayed, due to interference on the radio interface for example, then the handover may cause a break. In the downlink direction in particular, such a break may be inconveniently long.

Another weakness of the above described prior art solution is that if the speech coding method or the data transfer rate changes during the handover, this may cause interfering noises audible to the user of the mobile station. The speech coding method may need to be changed because new speech coding methods have been (or are being) introduced into many digital mobile communication systems. A mobile communication system may therefore employ various speech coding methods simultaneously and therefore situations arise in the system which require the speech coding method to be changed in connection with a handover. The GSM system (Global System for Mobile communications) is an example of such a system. In the GSM, a speech processing unit TRAU (Transcoder Rate Adaptor Unit) immediately changes the speech coding method when it receives a first new uplink speech frame and only then starts to apply the new speech coding method to downlink encoding. If the transmission delay is long, it is possible that downlink data coded with the previous speech coding method still arrives for some time after the handover, before the uplink data coded with the new method reaches the speech processing unit. This causes disturbing noises to the mobile station. To avoid such disturbing noises, the downlink connection should be delayed by a period of time which is twice the transmission delay. A delay of such a length would, however, cause a fairly distinct audio break in the downlink.

A break similar to the one described above may also appear in situations where the data transfer rate changes in connection with the handover, although the speech coding method remains the same. In the GSM system, for example, a speech coding method known as an AMR (Adaptive Multi Rate) method is about to be introduced, the method allowing the data transfer rate between the mobile station and the base station controller to be selected among eight alternative rates. This will allow the speech coding method of the ongoing connection to remain unchanged (in other words, both the new and the old data transfer channel apply the AMR method), but the data transfer rate of the connection will, nevertheless, change in connection with the handover.

It is an object of the present invention to solve the above problems and to provide a solution which allows a BSC-internal handover to be carried out so that it interferes with the ongoing connection as little as possible. The invention aims particularly at providing a solution which allows the interference to be minimized in a BSC-internal handover where the speech coding method or the data transfer rate changes. These objects are achieved with a method of the invention for performing a handover where a telecommunications channel used by a connection between a mobile station and a mobile services switching centre is changed in a mobile communication system where the telecommunications channel comprises a radio channel connecting the mobile station and a base station and a channel connecting the base station and the mobile services switching centre. The method of the invention is characterized in that the method comprises the steps of selecting a new radio channel for the connection in question; checking whether the handover is a BSC-internal handover where the base station employing the new radio channel and the base station employing the old radio channel are controlled by one and the same base station controller; checking whether a predetermined trigger condition is met, which happens if either the speech coding method or the data transfer rate changes, or if they both change at the same time, in connection with the handover; and directing a switching function located in the mobile services switching centre to perform the handover, provided that the checks show that the handover is a BSC-internal handover where the trigger condition is met.

The invention further relates to a mobile communication system where the method of the invention can be applied. The mobile communication system of the invention comprises: a mobile services switching centre, a mobile station communicating with the mobile services switching centre over a first telecommunications channel; and control means for directing the handover with the view of replacing the first telecommunications channel used for a connection between the mobile station and the mobile services switching centre by a second telecommunications channel. The system of the invention is further characterized in that the system further comprises: comparison means comparing the speech coding method and the data transfer rate used by the first telecommunications channel with one or more speech coding methods and data transfer rates available to the second telecommunications channel in order to find out whether a predetermined trigger condition is met, which happens if the speech coding method used by first telecommunications channel is not available to the second telecommunications channel and/or if the data transfer rate of the second telecommunications channel is different from the data transfer rate of the first telecommunications channel; checking means checking whether the handover is an internal handover of the base station controller where the base station transmitting the first telecommunications channel is controlled by the same base station controller as the base station transmitting the second telecommunications channel; and that the control means direct the switching function of the mobile services switching centre to perform the handover, provided that the comparison means and the checking means show that the handover is an internal handover of the base station controller where the trigger condition is met.

The invention still further relates to a base station controller that can be used in the system of the invention. The base station controller of the invention comprises: control means for directing a handover with the view of replacing a first telecommunications channel used for a connection between a mobile station and a mobile services switching centre by a second telecommunications channel. The base station controller of the invention is characterized in that the base station controller further comprises: comparison means for comparing the speech coding method and the data transfer rate used by the mobile station on the first telecommunications channel with one or more speech coding methods available to the second telecommunications channel and with the data transfer rate available to the second telecommunications channel in order to find out whether a predetermined trigger condition is met, which happens if the speech coding method used by the first telecommunications channel is not available to the second telecommunications channel, and/or if the data transfer rate of the second telecommunications channel is different from that used by the first telecommunications channel; checking means checking whether the handover is an internal handover of the base station controller where the base station transmitting the first telecommunications channel and the base station transmitting the second telecommunications channel are controlled by the base station controller in question; and that the control means direct the switching function of the mobile services switching centre to perform the handover, provided that the comparison means and the checking means show that the handover takes place within the base station controller and that the trigger condition is met.

The invention is based on the idea that when the switching function located in the mobile services switching centre is used for carrying out a BSC-internal handover where the trigger condition is met (i.e. either the speech coding method or the data transfer rate changes, or they both change at the same time, in connection with the handover), the interference caused by the handover to the ongoing connection can be minimized. The handover is then performed as if it took place between two different base station controllers, which allows interference caused to downlink signals in particular to be minimized. In the invention, this kind of handover is achieved by applying a signalling procedure which corresponds to signalling taking place in connection with a handover between two base station controllers, although physically the signalling procedure is carried out under the control of only one base station controller and between the mobile services switching centre and the base station controller in question. Hence, the most significant advantage of the invention is that it allows a BSC-internal handover which causes less interference to the ongoing connection to be carried out also in situations where the speech coding method or the data transfer rate changes in connection with the handover.

BSC-internal handovers may be handover processes where the traffic channel between two base stations is changed, or, alternatively, handovers where a new channel is allocated to the connection at the same base station which provided the previous channel of the connection. The solution of the invention can be applied in both cases.

The preferred embodiments of the method and mobile communication system of the invention are disclosed in the accompanying dependent claims 2–5 and 7–12.

In the following the invention will be described in greater detail and with reference to the accompanying drawings, in which

Figure 2A:
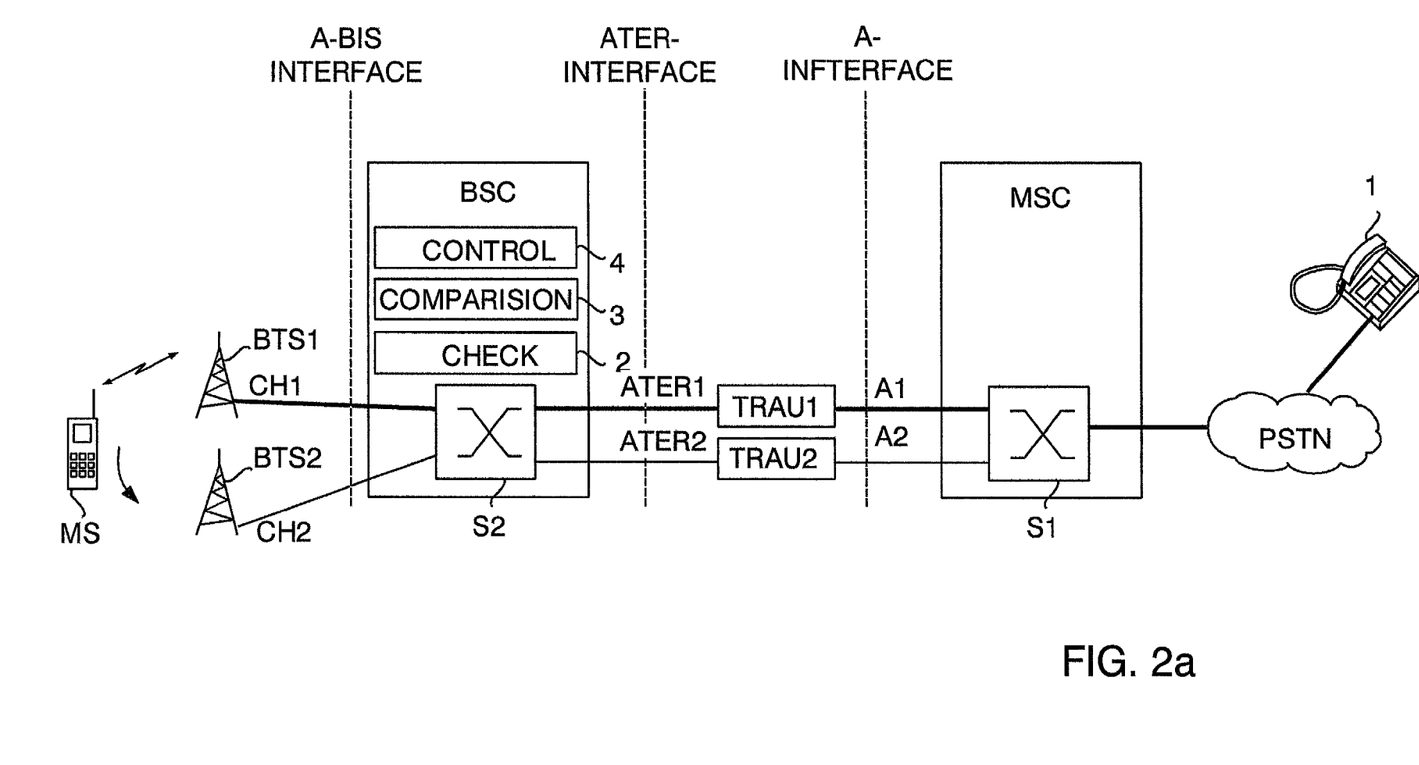
FIGS. 2a–2c are block diagrams illustrating a first preferred embodiment of the mobile communication system of the invention.
Figure 2B:
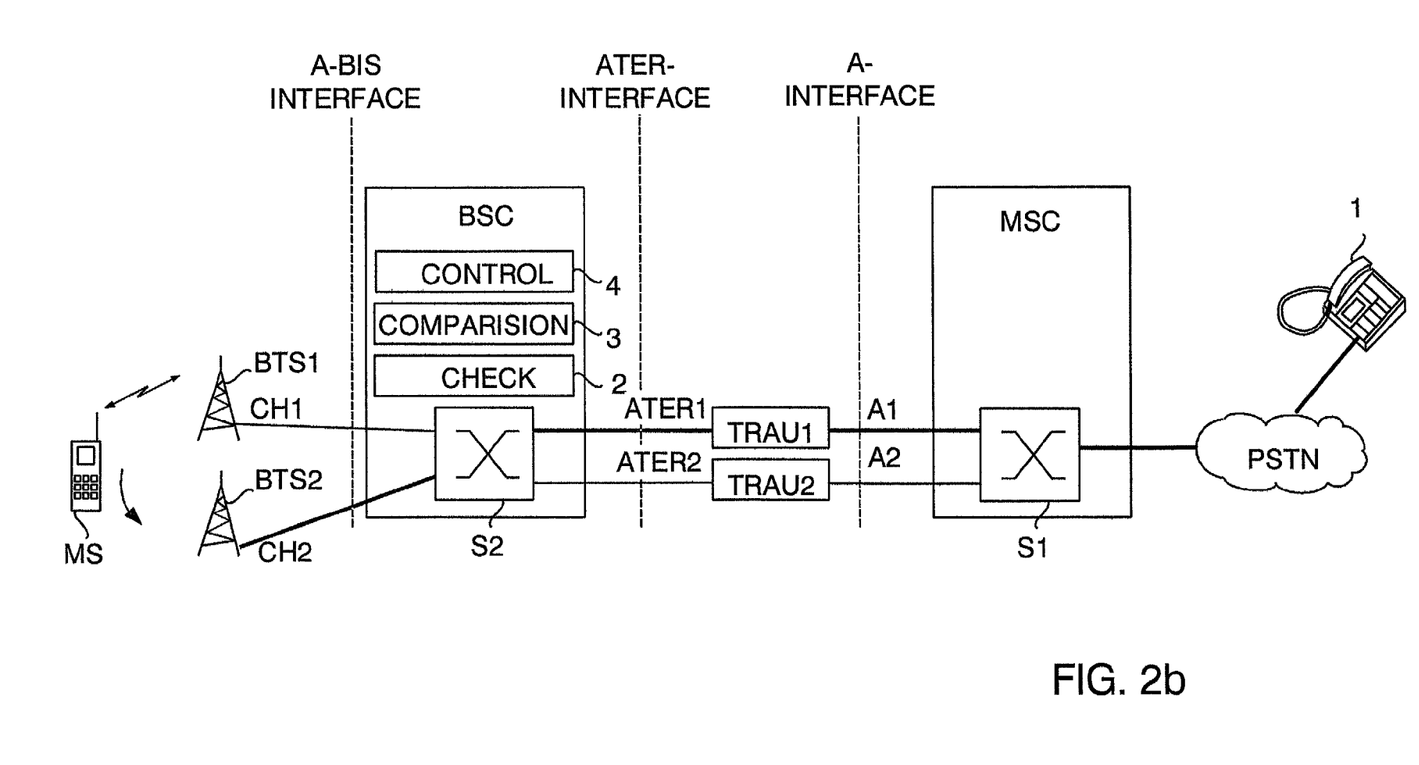
Figure 2C:
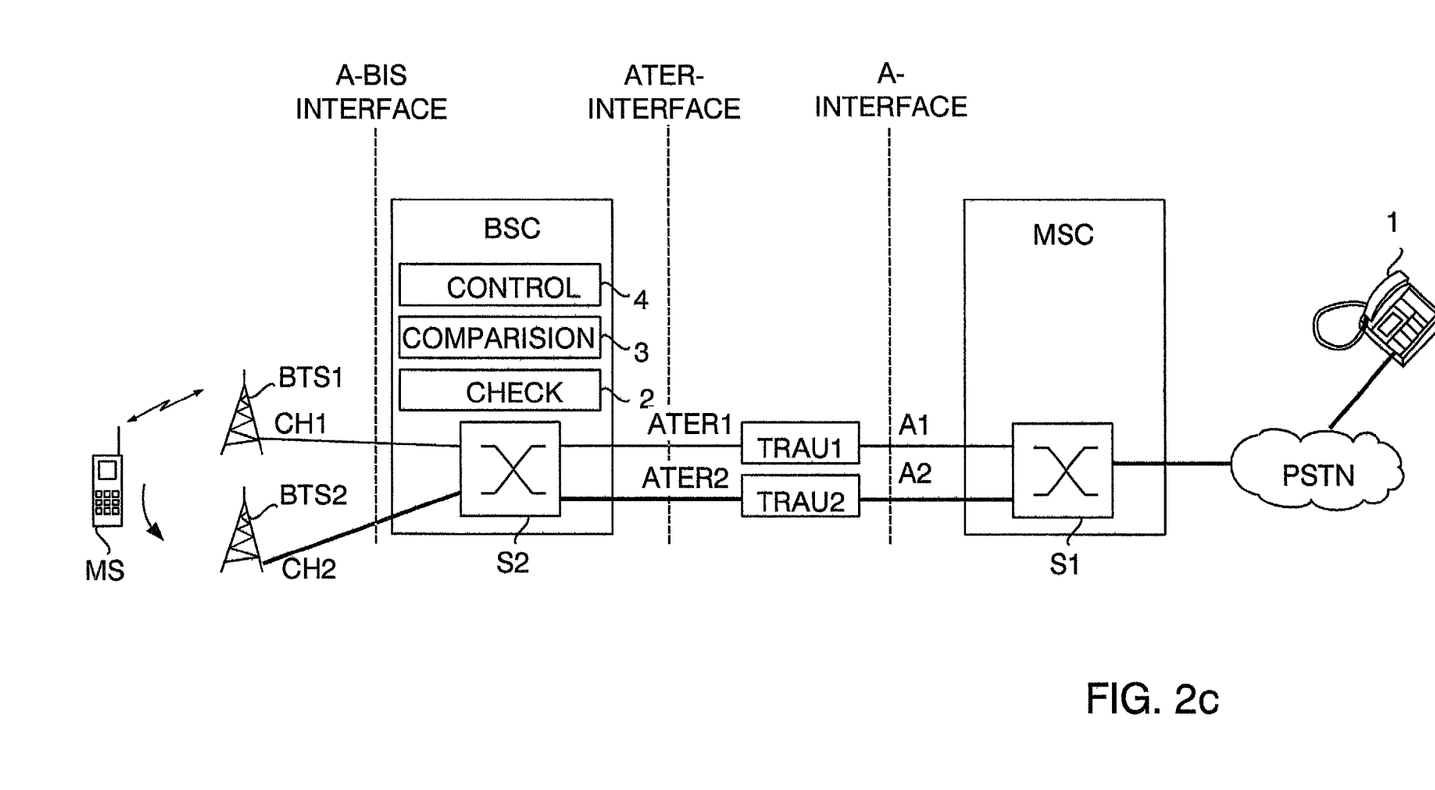

FIGS. 2a–2c are block diagrams illustrating the first preferred embodiment of the mobile communication system of the invention. The mobile communication system shown in FIGS. 2a–2c may be for example the GSM system.

FIG. 2a shows an initial situation where a mobile station MS has a connection to a mobile services switching centre MSC over a telecommunication channel CH1 and further to a subscriber terminal 1 of the fixed telephone network PSTN, for example, through the mobile services switching centre MSC. The telecommunications channel CH1 of FIG. 2a, which is indicated with a thick continuous line, is composed of a radio channel between a base station BTS1 and the mobile station MS and a channel between the base station BTS1 and the mobile services switching centre MSC. In FIG. 2a, the channel between the base station BTS1 and the mobile services switching centre comprises a channel between the base station BTS1 and a base station controller BSC, an Ater interface channel Ater1 between the base station controller BSC and a speech processing unit TRAU1, and an A interface channel A1 between the speech processing unit TRAU1 and the mobile services switching centre MSC.

The frequency spectrum required by a digital mobile communication system, such as the GSM, depends on the transfer rate employed on the radio path. The greater the transfer rate used on the radio path, the broader the frequency spectrum it requires. This is why the speech coding used in the PSTN/ISDN (Public Switched Telephone Network/integrated Services Digital Network), which transfers digital coded data at a rate of 64 kbit/s per traffic channel, is usually not suitable for use on the radio path. A GSM radio path, for example, therefore employs speech coding methods of low bit rate (Half Rate, Full Rate, Enhanced Full Rate), instead of the fixed network speech coding. In addition to these speech coding methods, a method known as AMR (Adaptive Multi Rate) speech coding where the data transfer rate can be selected among eight alternative rates is about to be taken in use in the GSM.

In the mobile communication system of FIG. 2a, speech processing units TRAU1 and TRAU2 are arranged between the base station controller and the mobile services switching centre to allow the speech coding used on the radio path to be adapted to the speech coding used by the mobile services switching centre. The speech processing units (transcoders) carry out the necessary coding, decoding and rate adjustment functions. In other words, for example in the GSM, the speech processing units may have 64 kbit/s interfaces towards the mobile services switching centre MSC, and 8 kbit/s interfaces in connection with Half Rate speech coding or 16 kbit/s interfaces in connection with Full Rate or Enhanced Full Rate speech coding towards the base station controller.

When the mobile station MS in FIG. 2a moves away from the first base station BTS1 during the connection employing the first telecommunications channel, approaching at the same time a second base station BTS2, a need for handover to the second base station BTS2 arises. The base station controller BSC monitors the connection between the first base station BTS1 and the mobile station MS and when it detects that the connection degrades, it triggers the handover. The situation shown in FIG. 2a assumes that the handover is carried out by transferring the ongoing connection of the mobile station MS from the radio channel of the first base station BTS1 to the radio channel of the second base station BTS2.

When a radio channel has been selected for the connection at the second base station BTS2, checking means 2 located in the base station controller BSC check if the new base station, i.e. BTS2, is also controlled by the base station controller. In addition, the base station controller BSC knows the speech coding methods and data transfer rates available to the base stations it controls. This allows comparison means 3 located in the base station controller BSC to compare the speech coding method and the data transfer rate used by the first base station BTS1 with the speech coding method and the data transfer rate available to the second base station. A predetermined trigger condition may be stored into the comparison means 3, the condition being met if the speech coding method employed is not available to the second base station, or if the second base station cannot use the same data transfer rate as the first base station. In the invention, a control unit 4 located in the base station controller BSC is informed of the results of the check made by the checking means 2 and the comparison made by the comparison means 3 (i.e. whether the trigger condition is met or not). If the results show that 1) the handover is a BSC-internal handover in which the trigger condition is not met, the control unit 4 of the base station controller directs the switching function S2 to perform the handover. This means that a new telecommunications channel is allocated to the ongoing connection of the mobile station only for the portion between the base station controller BSC and the mobile station MS (i.e. a new radio channel and a new channel for the connection between the base station controller BSC and the new base station BTS2); in other words, the channel used by the speech processing unit or the mobile services switching centre does not change. FIG. 2b shows the situation prevailing after the handover operation has been completed. Comparison of FIGS. 2a and 2b shows that in spite of the handover, the Ater interface channel and the A interface channel of the connection have remained unchanged.

2) the handover is a BSC-internal handover in which the trigger condition is met, the control unit 4 of the base station controller directs the switching function S1 of the mobile services switching centre MSC to perform the handover. In this case the signalling takes place similarly as in a handover between two separate base station controllers, with the exception that it is controlled by only one base station controller and it is carried out between the base station controller BSC concerned and the mobile services switching centre MSC. In the situation shown in FIGS. 2a–2c this means that a new channel is allocated to the ongoing connection of the mobile station MS also for the portion between the base station controller and the mobile services switching centre. Consequently, the speech processing unit TRAU1, which was used on the first telecommunications channel CH1, is replaced with a second speech processing unit TRAU2 used on the second telecommunications channel CH2. FIG. 2c shows the situation prevailing after this handover. The comparison of FIGS. 2a and 2c shows that the Ater interface channel and the A interface channel have changed during the handover.

Figure 3A:
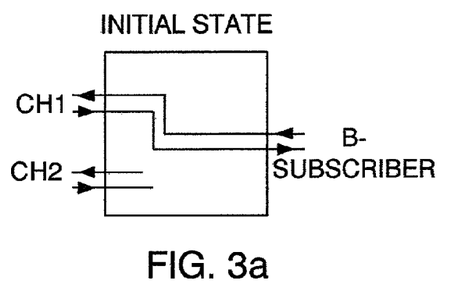
FIGS. 3a–3c illustrate a branching/summing function.
Figure 3B:
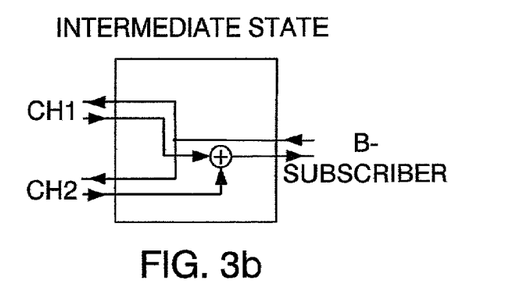
Figure 3C:
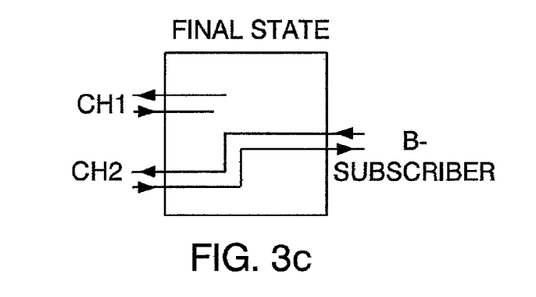

FIGS. 3a–3c illustrate a branching/summing function, which can be used in a switching function S1 of the mobile services switching centre shown in FIGS. 2a–2c for implementing the handover of the invention.

In the initial state shown in FIG. 3a, the branching/summing function transmits both uplink and downlink signals associated with the connection the mobile station has between subscriber B and the first telecommunications channel CH1. This initial state corresponds to the state shown in FIG. 2a.

When the mobile station has moved to a location where the base station controller triggers the handover, the branching/summing moves to an intermediate state shown in FIG. 3b where it starts to branch a downlink data flow to the first and the second telecommunications channel CH1 and CH2. At the same time the branching/summing function starts to sum the data flow transmitted over the first and the second telecommunications channels CH1 and CH2 in the uplink and to transmit the summed data flow to subscriber B. The intermediate state shown in FIG. 3b is usually activated shortly before a Handover Command is sent to the mobile station.

When the handover has been successfully completed (Hanodver Complete), the branching/summing function moves to a final state, shown in FIG. 3c, where it transmits a data flow both uplink and downlink only between the second, i.e. a new telecommunications channel CH2 and subscriber B. The final state corresponds to the situation shown in FIG. 2c. The branching/summing function of FIGS. 3a–3c used in the handover allows the break that commonly occurs in a prior art handover process to be essentially shortened.

The branching/summing function can be used to sum uplink signals by applying signal processing, where a-law companded 8-bit samples are first converted to 13-bit linear samples. The 13-bit linear samples can then be summed together. Finally the summed 13-bit linear samples are again converted to companded 8-bit samples which are then further transmitted towards subscriber B. As regards the downlink, a 64 kbit/s data flow can be branched, i.e. copied as such, without any additional operations, to the first and the second telecommunications channels CH1 and CH2.

FIGS. 4a–4d illustrate a branching/switching function. The branching/switching function of FIGS. 4a–4d can be used in the switching function S1 of the mobile services switching centre MSC shown in FIGS. 2a–2c for performing the handover of the invention. The branching/switching function shown in FIGS. 4a–4d is thus an alternative to the branching/switching function of FIGS. 3a–3c in that the switching function S1 of the mobile services switching centre may utilize either of the two alternatives. The branching/switching function shown in FIGS. 4a–4d is also applicable to the switching function S2 of the base station controller BSC where it is used as defined in the invention in those BSC internal handover situations where the speech coding method does not change.

Figure 4A:
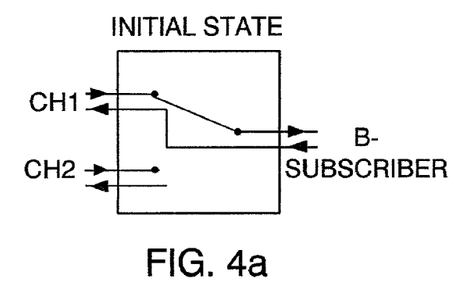
FIGS. 4a–4d illustrate a branching/switching function.

The handover shown in FIGS. 4a–4d takes place in three phases, the switching function having two intermediate states between the initial state and the final state. FIG. 4a shows the initial state, i.e. a state where the connection between the mobile station MS and the mobile services switching centres MSC employs the radio channel used by the first base station BTS1. In this case, a compressed speech signal travels between the first base station BTS1 and the base station controller BSC on the channel CH1. When the base station controller BSC decides to perform an internal handover, it sends a Channel Activation message to the second base station BTS2 and the second base station BTS2 acknowledges the message (Channel Activation Acknowledgement), the first step in the handover being thus completed.

Figure 4B:
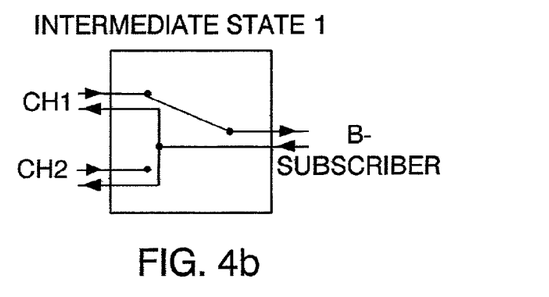

In the first step of the handover, the branching/switching function moves from the initial state of FIG. 4a to the intermediate state 1 of FIG. 4b. The compressed downlink speech signal transmitted from subscriber B is then branched to the second telecommunications channel CH2 as well. In the uplink, subscriber B remains only connected to the first telecommunications channel CH1 by the branching/switching function. The base station controller BSC then sends a Handover Command to the mobile station through the base station BTS1, and the mobile station MS tunes to the channel of the second base station BTS2. When the mobile station MS has successfully tuned to the channel of the second base station, the second base station BTS2 sends information (Handover Detect) about this to the base station controller BSC. This completes the second step in the handover.

Figure 4C:
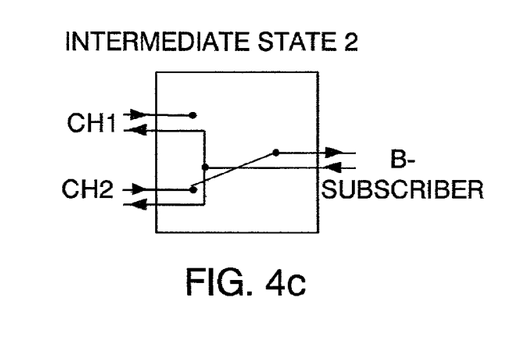

In the second step of the handover, the branching/switching function moves from the intermediate state 1 of FIG. 4b to the intermediate state 2 of FIG. 4c. The branching/switching function uses the double-throw switch function to connect the uplink data flow coming from subscriber B from the channel CH1 to the channel CH2. The branching/switching function branches the compressed downlink speech signal further to the first channel CH1 and the second channel CH2. After the handover has been successfully completed (Handover Complete), the third step in the handover process will be carried out.

Figure 4D:
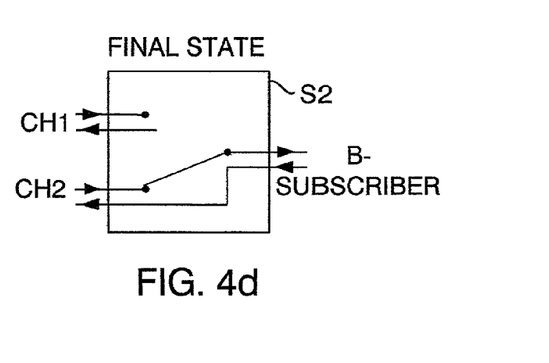

In the third step of the handover, the branching/switching function moves from the intermediate state 2 of FIG. 4c to the final state of FIG. 4d. In the final state, the uplink signals received from the second channel CH2 are transmitted to subscriber B and, correspondingly, the downlink signals from subscriber B are transmitted to the second channel CH2. If the handover is performed by the switching function S2 of the base station controller, then the final state corresponds to the situation shown in FIG. 2b. The handover in question is then a BSC-internal handover where the speech coding method and the telecommunications rate do not change. On the other hand, if the handover is performed by the switching function S1 of the mobile switching centre, then the final state corresponds to the situation shown in FIG. 2c. In this case the handover in question is a BSC-internal handover where the speech coding method and/or the data transfer rate change.

The branching of the downlink signals to the channels CH1 and CH2, shown in FIGS. 4b and 4c, allows handover to be performed with a shorter break in the downlink signals. Because of the branching, the duration of the break depends on nothing else than on how fast and disturbance-free the mobile station is able to change from channel CH1 at the first base station BTS1 to channel CH2 at the second base station BTS2.

Figure 5:
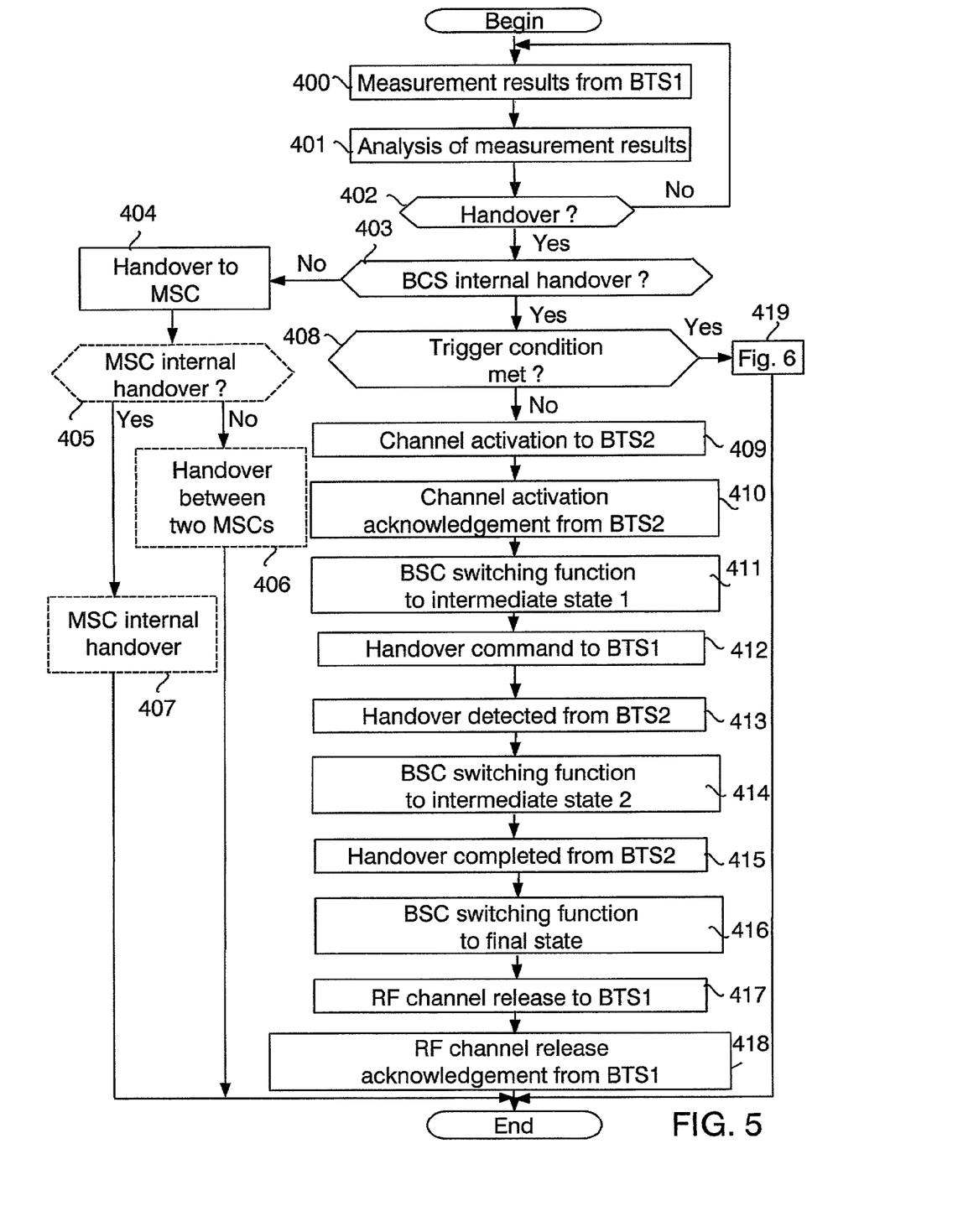
FIGS. 5 and 6 illustrate a first preferred embodiment of the invention.
Figure 6:
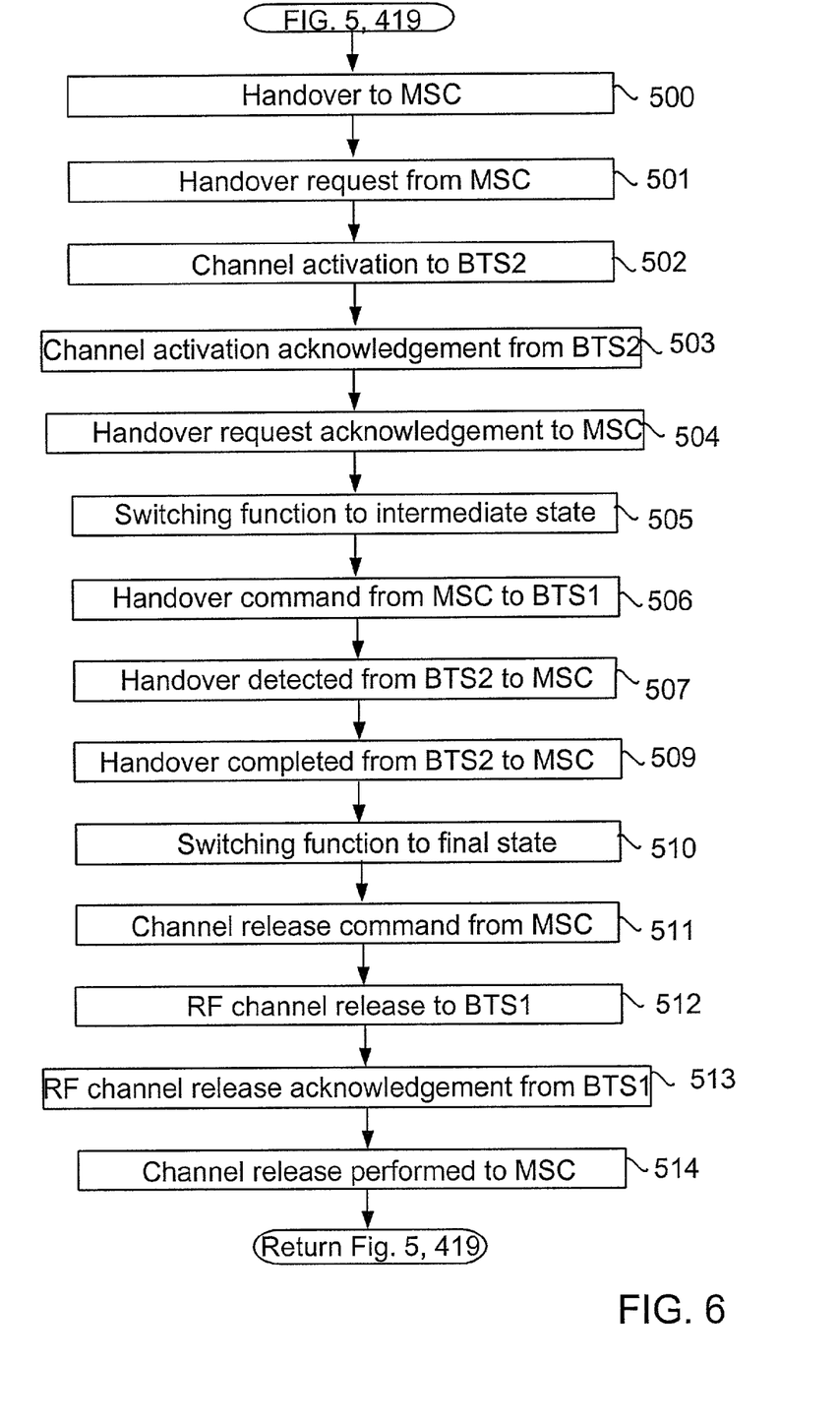

FIGS. 5 and 6 illustrate a first preferred embodiment of the method of the invention. FIGS. 5 and 6 show an example of how the invention can be applied in the GSM system. The flow diagram refers to the signalling messages and the switching function states associated with the handover. It is to be noted that the switching function states may change at different points of the signalling messages than what is shown in the flow diagram. The signalling messages and the switching functions have been shown from the point of view of the base station controller BSC. For this reason the switching function states of the mobile services switching centre MSC are shown with broken lines. The signalling messages at the radio interface and some of the signalling messages between the MSC-BSC and the BSC-BTS have been left out because they are not essential for the operation of the invention. The flow diagram shows a successful handover. If the handover fails or if an otherwise abnormal state is entered, the process proceeds exactly as given in the GSM recommendations in this regard.

The initial state (FIG. 5) assumes that there is an ongoing connection (such as a call) and that the traffic is routed via the first base station BTS1. The base station controller BSC then receives measurement reports from the first base station BTS1 (step 400) at the pace of a SACCH block on the air interface at intervals of 480 ms. These measurement reports contain both the measurement reports on the quality of the downlink air interface sent by the mobile station MS and those made on the quality of the uplink air interface by the first base station BTS1. The measurement reports contain raw data on the quality of both the current radio channel (CH1) and the neighbouring base stations. The handover algorithm (step 401) located in the base station controller BSC continuously analyzes the raw data and if, due to the air interface quality or for traffic reasons, for example, it is advantageous to perform a handover (step 402), the handover process is initiated and the routine proceeds to step 403. If it is decided that the handover is not going to be carried out, then the routine returns to step 400 and continues to receive and analyse measurement results.

In step 403 it is checked whether the target base station BTS2 and its traffic channel CH2 are controlled by the same base station controller BSC as the current base station BTS1. The base station controller BSC is able to conclude on the basis of the measurement reports sent by the mobile station MS whether the target base station BTS2 is controlled by the base station controller BSC in question.

If the target base station is controlled by another base station controller or mobile services switching centre, then a Handover Required message (step 404) is sent to the mobile services switching centre, the message containing the necessary information about the target base station or, alternatively, a list of the target base stations in their order of preference. In step 405 the mobile services switching centre MSC investigates whether the handover is an MSC-internal handover or one between two mobile services switching centres. On the basis of the results, either a normal MSC-internal handover (step 407) or a handover between two mobile services switching centres (step 406) is carried out. In both cases the switching of the traffic channels takes place at the mobile services switching centre, which allows either the branching/summing function or the branching/switching function to be applied so as to minimize the downlink switching break, irrespective of whether the speech coding method and the data transfer rate of the target base station BTS2 are the same as the speech coding method and the data transfer rate of the serving base station BTS2.

If it is stated in step 403 that the handover in question takes place within the base station controller BSC, the routine checks in step 408 whether the trigger condition in use is met. According to the invention this is done by checking whether the speech coding method of the target base station BTS2 is the same as that of the current base station BTS1. It also also checked whether the data transfer rate of the connection (between the mobile station and the base station controller) changes if the handover is performed. If the handover were to lead to a situation where the speech coding method or the data transfer rate changes (or where they both change at the same time), this would mean that the trigger condition is met. The above information can be obtained because the base station controller BSC always has information both about the accepted speech coding methods and the available data transfer rates of both the present base stations and the target base stations.

If it is detected that the trigger condition is not met when the base station is changed, then a normal BSC-internal handover is performed, which is shown in steps 409–418. The process starts at step 409 with the activation of the traffic channel to the target base station (channel activation), which is acknowledged by the target base station BTS2 in step 410 (channel activation acknowledgement) when the new traffic channel has been activated both to air and abis interfaces. When the base station controller BSC receives the channel activation acknowledgement, the branching/switching function of the traffic channels of the base station controller BSC is set to the intermediate state 1 (see FIG. 4b). The mobile station is then sent a handover command via the serving base station BTS1 and when the mobile station MS receives the command, it tunes to the new channel CH2 of the target base station BTS2. When the target base station BTS2 detects a Handover Access burst from the mobile station, it sends a handover detect message to the base station controller BSC (step 413). At this stage the branching/switching function of the base station controller BSC is set to the intermediate state 2 (step 414) and, as a result, also uplink data is transmitted via the second base station BTS2. After a successful handover, the mobile station sends a Handover Complete message (step 415) via the second base station BTS2. The branching/switching function can then be set to the final state, because there is no longer any risk of the mobile station returning to the channel of the first base station BTS1 due to failed signalling. Finally, the base station controller BSC sends the first base station BTS1 an RF channel release message in step 417 which the base station acknowledges (RF channel release acknowledgement) after it has released the channel (step 418).

If it is detected in step 408 that the trigger condition will be met if the base station is changed, a BSC-internal handover controlled by the mobile services switching centre MSC is carried out as shown in FIG. 6. The base station controller BSC first sends the mobile services switching centre MSC a handover required message in step 500. This message shows for example the channel of the serving base station BTS1, the current speech coding method and a cell identifier of the new base station BTS2 or, alternatively, a cell identifier list giving the new base stations in their order of preference. In the next step 501 the mobile services switching centre sends a handover request to the base station controller BSC, the request comprising information for example about the channel of the serving base station BTS1, the current speech coding method and the cell identifier of the new base station BTS2. In an ordinary handover taking place between two base station controllers BSC this message is sent to the target base station controller, but when a BSC-internal handover is concerned, the message is sent to the current base station controller BSC. In step 502 the traffic channel is activated to the base station BTS2 (channel activation) which is acknowledged by the target base station BTS2 in step 503 (channel activation acknowledgement) when the new traffic channel has been activated both to the air interface and the abis interface. Next the base station controller BSC acknowledges the handover request message to the mobile services switching centre MSC in step 504. This acknowledgement comprises for example the handover command to be transmitted to the mobile station, the channel in the new base station BTS2 and the new speech coding method. In step 505 the switching function is set to the intermediate state (it is assumed in this connection that the branching/summing switching function of FIGS. 3a–3c in particular is used in connection with the flow diagram of FIG. 6).

The mobile services switching centre MSC then sends, in step 506, the handover command to the mobile station MS via the base station controller BSC and the serving base station BTS1 and, after having received the command, the mobile station MS tunes to the new channel CH2 of the target base station BTS2. As the new base station BTS2 detects a Handover Access burst from the mobile station, the base station BTS2 sends a handover detect message to the mobile services switching centre MSC through the base station controller BSC (step 507).

After a successful handover the mobile station MS sends a Handover Complete message through the new base station BTS2 which the base station controller BSC forwards to the mobile services switching centre MSC (step 509). The switching function is then set to the final state in step 510. Finally, the traffic channel of the original base station BTS1 is released in steps 511–514. First the mobile services switching centre MSC sends a Clear Command message in step 511, after which the base station controller BSC sends, in step 512, an RF channel release message to the original base station BTS1 which the base station acknowledges, after it has released the channel (step 513), with an RF channel release acknowledgement. The process is completed by a Clear Complete message sent to the mobile services switching centre MSC (step 514).

It is to be understood that the above specification and the related drawings are only meant to illustrate the present invention. A person skilled in the art will find it apparent that the invention can be modified and varied in different ways without departing from the scope and spirit of the invention disclosed in the accompanying claims.

What is claimed is:

1. A method for performing a handover where a telecommunications channel used by a connection between a mobile station and a mobile services switching centre is changed in a mobile communications system where the telecommunications channel consists of a radio channel connecting the mobile station and a base station and of a channel connecting the base station and the mobile services switching centre, wherein the method comprises selecting a new radio channel for the connection in question;

checking whether the handover is an internal handover of the base station controller where the base station employing the new radio channel and the base station employing the old radio channel are controlled by one and the same base station controller;

checking whether a predetermined trigger condition is met, said condition being met if either the speech coding method or the data transfer rate changes, or if both the speech coding method and data transfer rate change at the same time, in connection with the handover; and directing a switching function located in the mobile services switching centre to perform the handover, provided that the checks show that the handover is an internal handover of the base station controller where the trigger condition is met, or alternatively directing a switching function of the base station controller to perform the handover in question, provided that the checks show that the handover is an internal handover of the base station controller where the trigger condition is not met.

2. A method according to claim 1, wherein the process where the switching function of the mobile services switching centre or the base station controller is directed to perform the handover comprises the following:

a first step where the switching function starts to branch telecommunications signals sent by the mobile services switching centre in the downlink direction to the mobile station such that the signals in question are supplied from the switching function further to both the base station employing the old radio channel and to the base station employing the new radio channel;

a second step where the switching function interrupts the supply of telecommunications signals transmitted from the base station employing the old radio channel in the uplink direction and starts the to supply in the uplink direction telecommunications signals received from the mobile station by the base station employing the new radio channel; and a third step where the switching function interrupts the supply of telecommunications signals, sent to the mobile station by the mobile services switching centre, in the downlink direction to the base station employing the old radio channel.

3. A method according to claim 2, wherein the first step is entered when a radio channel has been activated for the connection in question at the base station employing the new radio channel, the second step is entered when the base station employing the new radio channel detects that the mobile station has tuned to the new radio channel; and the third step is entered when the mobile station confirms that it has started to use the new radio channel.

4. A method according to claim 1, wherein the process for directing the switching function of the mobile services switching centre to perform the handover comprises the following:

a first step where the switching function starts to branch telecommunications signals to be sent in the downlink direction to the mobile station such that the signals are supplied from the switching function further to both the base station that employs the old radio channel and the base station employing the new radio channel, and to sum the telecommunications signals transmitted in the uplink direction by the base station employing the old radio channel and the base station employing the new radio channel, and to forward the summed signals; and a second step where the switching function interrupts the supply of signals in both the uplink and downlink directions between the mobile services switching centre and the base station employing the old radio channel.

5. A mobile communications system comprising a mobile services switching centre;

a mobile station having a connection to the mobile services switching centre over a first telecommunications channel, and control means for directing a handover to replace the first telecommunications channel used for the connection between the mobile station and the mobile services switching centre with a second telecommunications channel, wherein the system further comprises comparison means comparing the speech coding method and the data transfer rate used on the first telecommunications channel with one or more speech coding methods and data transfer rates available on the second telecommunications channel in order to find out whether a predetermined trigger condition is met, said condition being met if the speech coding method used on the first telecommunications channel is not available on the second telecommunications channel and/or if the data transfer rate of the second telecommunications channel is different from the data transfer rate of the first telecommunications channel;

checking means checking whether the handover is an internal handover of a base station controller where the base station transmitting the first telecommunications channel is controlled by the same base station controller as the base station transmitting the second telecommunications channel; wherein the control means direct the switching function of the mobile service switching centre to perform the handover, provided that the comparison means and the checking means show that the handover is an internal handover of the base station controller where the trigger condition is met or alternatively the control means direct the switching function of the base station controller to perform the handover, provided that the comparison means and the checking means show that the handover is an internal handover of the base station controller where the trigger condition is not met.

6. A mobile communication system according to claim 5, wherein the switching functions of the base station controller and the mobile services switching centre can be directed at least to a first state where the switching function branches telecommunications signals to be sent to the mobile station in the downlink direction to the base station transmitting the first telecommunications channel and the base station transmitting the second telecommunications channel and where the switching function supplies only signals received from the mobile station by the base station transmitting the first telecommunications channel in the uplink direction to the mobile services switching centre;

a second state where the switching function branches telecommunications signals to be sent to the mobile station in the downlink direction to the base station transmitting the first telecommunications channel and the base station transmitting the second telecommunications channel and where the switching function supplies only signals received from the mobile station by the base station transmitting the second telecommunications channel in the uplink direction to the mobile services switching centre; and a third state where the switching function supplies telecommunications signals to be sent to the mobile station in the downlink direction only to the base station transmitting the second telecommunications channel and where the switching function supplies only signals received from the mobile station by the base station transmitting the second telecommunications channel in the uplink direction to the mobile services switching centre;

wherein the control means direct the switching function to perform the handover in such a way that the switching function goes through the three states.

7. A mobile communications system according to claim 5, wherein the switching function of the mobile services switching centre can be directed at least to a first state where the switching function branches telecommunications signals to be sent to the mobile station in the downlink direction so that the signals are supplied from the switching function further to both the base station employing the first telecommunications channel and the base station employing the second telecommunications channel, and where the switching function sums in the uplink direction the signals received from the mobile station by the base station transmitting the first telecommunications channel and the signals received from the mobile station by the base station transmitting the second telecommunications channel and forwards the summed signals; and a second state where the switching function supplies telecommunications signals to be sent to the mobile station in the downlink direction only to the base station transmitting the second telecommunications channel and where the switching function supplies only signals received from the mobile station by the base station transmitting the second telecommunications channel further in the uplink direction.

8. A mobile communications system according to claim 5, wherein said base station transmitting the first telecommunications channel and said base station transmitting the second telecommunications channel are one and the same base station.

9. A mobile communications system according to claim 5, wherein said base station transmitting the first telecommunications channel and said base station transmitting the second telecommunications channel are different base stations.

10. A mobile communications system according to claim 5, wherein the mobile communication system is a digital mobile communication system in which the mobile station and the mobile services switching centre employ different speech coding methods and that the first and the second telecommunications channels are provided with speech processing units which perform the coding and decoding operations needed for supplying speech signals between the mobile station and the mobile services switching centre.

11. A base station controller comprising control means for directing a handover to replace a first telecommunications channel used for a connection between a mobile station and a mobile services switching centre with a second telecommunications channel, wherein the base station controller further comprises comparison means for comparing the speech coding method and the data transfer rate used by the mobile station on the first telecommunications channel with one or more speech coding methods available on the second telecommunications channel and with the data transfer rate available on the second telecommunications channel in order to find out whether a predetermined trigger condition is met, said condition being met if the speech coding method used on the first telecommunications channel is not available on the second telecommunications channel and/or if the data transfer rate of the second telecommunications channel is different from that used on the first telecommunications channel;

checking means checking whether the handover in question is an internal handover of a base station controller where the base station transmitting the first telecommunications channel and the base station transmitting the second telecommunications channel are controlled by the base station controller in question; wherein the control means direct the switching function of the mobile services switching centre to perform the handover, provided that the comparison means and the checking means show that the handover is an internal handover of the base station controller and that the trigger condition is met, or alternatively the control means direct the switching function of the base station controller to perform the handover, provided that the comparison means and the checking means show that the handover is an internal handover of the base station controller where the trigger condition is not met.

* * * * *